May 16, 1967 H. JOYCE, JR 3,319,748

CAPSTAN DRIVE

Filed Oct. 18, 1965 4 Sheets-Sheet 1

INVENTOR.
HARDIN JOYCE JR.

BY Moody and Phillion
ATTORNEYS

INVENTOR.
HARDIN JOYCE JR.
BY Moody and Phillips
ATTORNEYS

May 16, 1967 H. JOYCE, JR 3,319,748

CAPSTAN DRIVE

Filed Oct. 18, 1965 4 Sheets-Sheet 3

INVENTOR.
HARDIN JOYCE JR.

BY *Moody and Phillion*
ATTORNEYS

May 16, 1967 H. JOYCE, JR 3,319,748

CAPSTAN DRIVE

Filed Oct. 18, 1965 4 Sheets-Sheet 4

INVENTOR.
HARDIN JOYCE JR.
BY Moody and Phillion
ATTORNEYS

United States Patent Office 3,319,748

Patented May 16, 1967

3,319,748

CAPSTAN DRIVE

Hardin Joyce, Jr., Marion, Iowa, assignor to Collins Radio Company, Cedar Rapids, Iowa, a corporation of Iowa Filed Oct. 18, 1965, Ser. No. 497,371

9 Claims. (Cl. 192—18)

The invention relates generally to a high-speed capstan tape drive for a tapestand and, more specifically, to a single capstan tape drive employing a fast acting, positive drive, clutch arrangement.

When driving a tape capstan it is necessary in most cases to be able to stop the tape very rapidly and then to accelerate the tape in either a clockwise or a counterclockwise direction very rapidly, i.e., in the order of a few milliseconds. There are prior art structures which function to drive a shaft in either a clockwise or a counterclockwise direction, and also to brake the shaft. One such prior art arrangement comprises three discs of magnetic material mounted on the shaft whose rotation is to be controlled. An electromagnet is provided for each discs, with the poles thereof positioned across the periphery of the associated disc. In the case of two of the three discs, the electromagnets are mounted on a flywheel type structure which rotates freely and concentrically with the shaft. One of these flywheel arrangements rotates in a clockwise direction and the second rotates in a counterclockwise direction. When either of the two rotatable electromagnets is energized, currents are induced in the disc and the interaction of the two magnetic fields (i.e., the fields created by the electromagnet and induced current in the disc), will cause the disc to rotate in the same direction as the energized electromagnet. Such action is much the same as occurs in the operation of a squirrel cage motor. However, as in the case of squirrel cage motors, there exists a certain amount of slippage during the acceleration period, due to the inertia of the assembly including the shaft and the three discs mounted thereon. Such slippage is of sufficient magnitude to make it unsuitable for operation in a tape drive system. The third electromagnet is fixed and functions to brake the shaft. The poles of said third electromagnet are positioned across the periphery of said third disc in a manner similar to that of the poles of the two rotatable electromagnets re their associated discs. Suitable interlocking arrangements are provided so that only one of the three electromagnets is energized at any given time.

An object of the present invention is to provide a tape capstan drive employing flywheel type driving arrangements, but in which the accelerating and decelerating time is very rapid; in the order of two or three milliseconds, which is suitable for a tape drive.

A second object of the invention is a tape drive arrangement employing a capstan shaft with flexible lightweight discs therein; which structure is of relatively low inertia and which is driven in either angular direction by a high inertia driving source by means of clutches which positively grip and release said discs.

A further object of the invention is a reliable, positive acting, fast starting and fast stopping capstan drive.

A fourth object of the invention is the improvement of capstan tape drives, generally.

In accordance with the invention, the capstan driving shaft is supported on two suitable pedestal bearings. Fixed on the shaft are a lightweight capstan at one end and three concentric thin flexible discs, spaced apart at suitable intervals on the shaft and which may be comprised of beryllium copper. Two counter-rotating clutch assemblies supported on bearings on the shaft and each driven by a constant speed motor, are positioned, when energized, to selectively engage either of two of the three discs. A brake, basically like the counter-rotating clutches, but which does not rotate, is positioned when energized, to engage the third disc. Thus, by energizing one of the two counter-rotating clutches or, alternatively, the braking means, the capstan can be rotated in either direction or stopped.

Each of the flywheels has a large annularly shaped groove formed in the outer perimeter thereof to cause the radial cross section of the flywheel to be generally U-shaped. In this U-shaped groove there is placed a permanent magnet which is annular in shape and extends completely around the flywheel. The U-shaped portion of the flywheel provides the path for the magnetic flux which flows from said permanent magnet in radial planes around the flywheel. A second groove or slot is cut into the U-shaped flywheel on the side adjacent the associated disc. Such second slot is also annular in shape in that it extends completely around the flywheel. An annular-shaped coil, somewhat flat in configuration, is positioned within this slot. At the axial end of the coil, near the discs, there is provided a first clutch face. An arm, rigidly attached to the U-shaped flywheel, extends around to the other side of the disc and terminates in a second clutch face positioned opposite said first clutch face. When the annular coil is energized, the magnetic fields are such that the coil is forced to move outward from the flywheel and towards the discs. Since the disc is flexible it will give somewhat and the two clutch faces will then grip the disc therebetween, with negligible slippage. Acceleration of the disc to the speed of the flywheel occurs in approximately two milliseconds. Suitable driving means are provided for the clockwise and counterclockwise rotating U-shaped flywheels.

The above-mentioned and other objects and features of the invention will be more fully understood from the following detailed description thereof when read in conjunction with the drawings in which.

Figure 1:
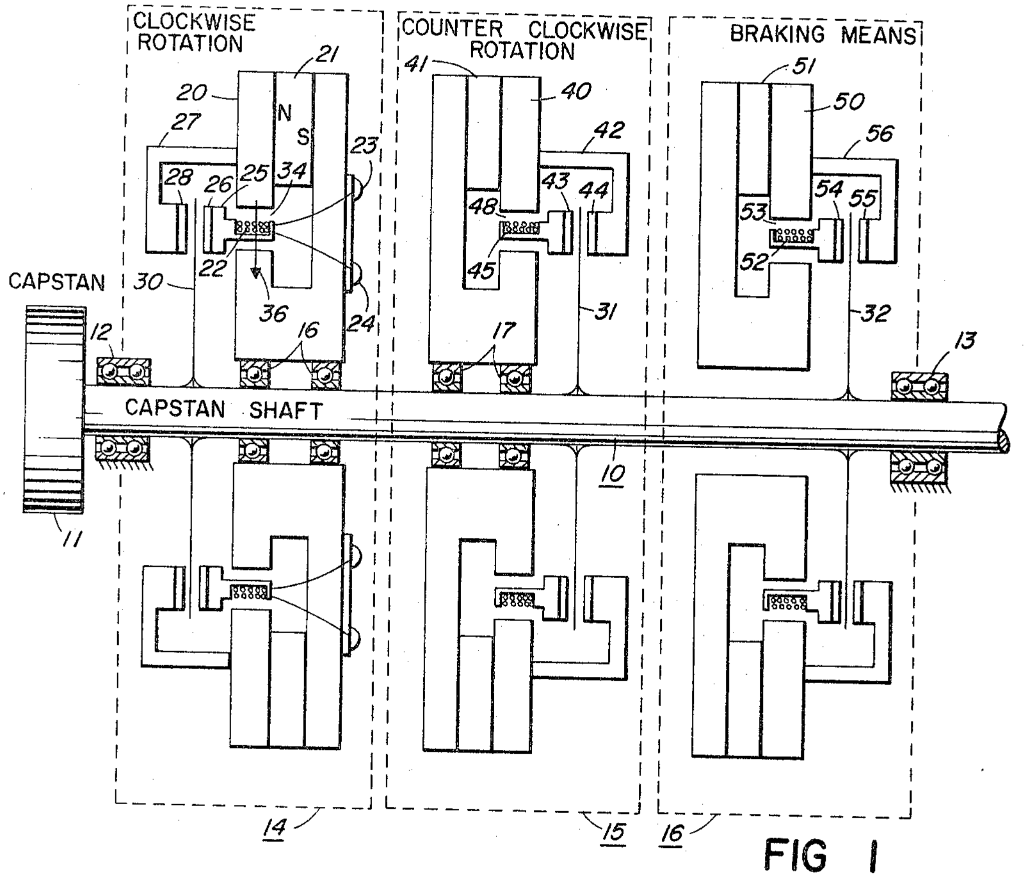
FIG. 1 is a plan view of the drawing showing the capstan shaft, the flexible discs thereon, the clockwise and the counterclockwise driving flywheels, and the braking means.

Referring now to FIG. 1, there is shown a capstan shaft 10 with a capstan 11 mounted at one end therein. The shaft 10 is mounted on suitable bearing arrangements 12 and 13. Mounted on the shaft are two flywheel arrangements identified generally by reference characters 14 and 15. These flywheel arrangements 14 and 15 are mounted on the shaft by bearings 16 and 17, respectively, and are driven by means (not shown). The said flywheel driving means is independent of the rotation of the shaft except when the clutching arrangement is energized.

The third dotted rectangle 16 in FIG. 1 represents the braking means which does not rotate and, consequently, is not mounted on the capstan shaft by bearing means.

Mounted rigidly on shaft 10 are three flexible discs 30, 31, and 32, which may be of beryllium copper for example. The perimeter of each of these three discs passes between faces of a clutch which is individual thereto. For example, in flywheel arrangement 14 the flexible disc 30 is positioned between the surfaces 28 and 26 which comprise the faces of a clutch arrangement. The clutch face 26, which can be of any suitable material, as for example, a cork material, having the proper characteristics for gripping disc 30, is secured to form 25. Supported upon the form 25 is an annular coil 22 which extends completely around a slot 34 formed in the flywheel arrangement. A principal part of the flywheel arrangement consists of the section 20, which has a generally U-shaped cross section, as can be seen from FIG. 1, and which is comprised of a magnetic material. Positioned between the open end of the U-shaped section 20 is a permanent magnet 21 which has North and South poles positioned as indicated in FIG. 1, so that the magnetic flux will flow around the U-shaped portion 20 of the flywheel in a radial plane and will pass through gap 34 in the direction of the arrow 36. Then, when a current is passed through coil 22, an interaction of magnetic fields is set up which forces the annular coil 22 to the left in accordance with well-known principles. The clutch face 26 will then move to the left in FIG. 1 and grip the flexible discs 30 between the clutch faces 26 and 28, thus causing rapid acceleration of the disc 30, the shaft 10, and the capstan 11; all of which are fastened securely together.

The flywheel arrangement 15 operates in a manner similar to that of 14 except that it rotates in a counterclockwise direction rather than in a clockwise direction. The various elements of the flywheel arrangement 15 include an annularly shaped permanent magnet 41 positioned between the open ends of the large groove in the annularly shaped element 40. An annularly shaped coil 45 is positioned in a second groove 48 located in the U-shaped member 40. Clutch face 43 is secured to annular coil 45, and together with clutch face 44, which forms the terminal of arm 42, functions to grip flexible disc 31 therebetween when coil 45 is energized.

It will be noted that the flywheel driving arrangement 15 is a mirror image of flywheel arrangement 14. The reasons for having a mirrored image instead of an exact duplicate is largely one of convenience in design and manufacture.

In the dotted block 16 there is contained a braking means which includes a U-shaped element 50 which is similar to the U-shaped members 20 and 40 shown within blocks 14 and 15. However, the U-shaped element 50 in block 16 does not rotate. It is rigidly secured to some suitable frame member of the overall assembly. An annularly shaped permanent magnet 51 is positioned between the open arms of U-shaped member 50, and an annularly shaped coil 52 is positioned in an annular groove 53. At the end of coil member 52 is a clutch face 54 which is forced towards clutch face 55, mounted at the end of arm 56, when coil 52 is energized. The flexible disc 32 is gripped between clutch faces 54 and 55 to brake the shaft 10 to a stop condition in the order of two milliseconds.

Figure 5:
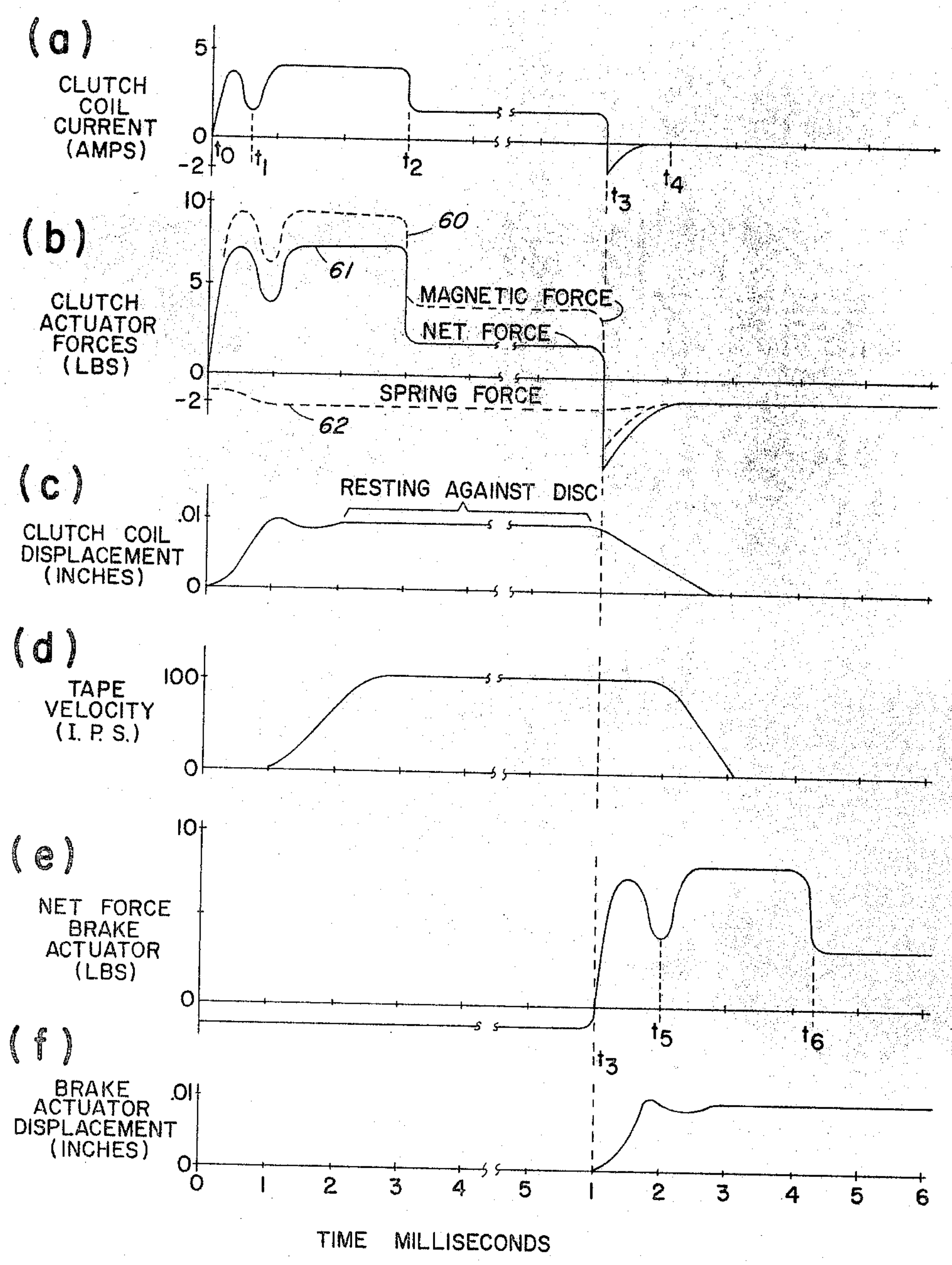
FIGS. 5*a* through 5*f* waveforms are showing the magnetic forces, clutch displacement, tap velocity, and braking forces employed in the invention.

Referring now to FIG. 5, there are shown the curves of energizing currents, the forces induced thereby, clutch coil displacement, tape velocity, and other characteristics relating to the operation of the device. More specifically, FIG. 5*a* shows a waveform of the current supplied to any of the three clutch coils 22, 45, or 52 of FIG. 1. It will be observed that the current, which is initiated at time $t_0$, rises sharply and then dips at time $t_1$. The current then again rises to a maximum until time $t_2$, when it decreases substantially. The current dip which occurs at time $t_1$ functions to minimize the bouncing effect which occurs as the coil impacts upon the disc. Without such dip the clutch face attached to the coil would strike the disc and then would have a tendency to bounce away from the disc thus creating a slippage condition and increasing the time required to accelerate up to full velocity. The dip occurring at time $t_1$ is timed to occur about at the moment of impact between the clutch face of the coil and the disc. Thus, the force with which the clutch face strikes the disc is appreciably reduced so that bounce is minimized. Immediately after time $t_1$ the energizing current is again increased to cause the clutch face to press firmly towards the clutch face on the other side of the disc and thereby grip said disc therebetween.

Figure 3:
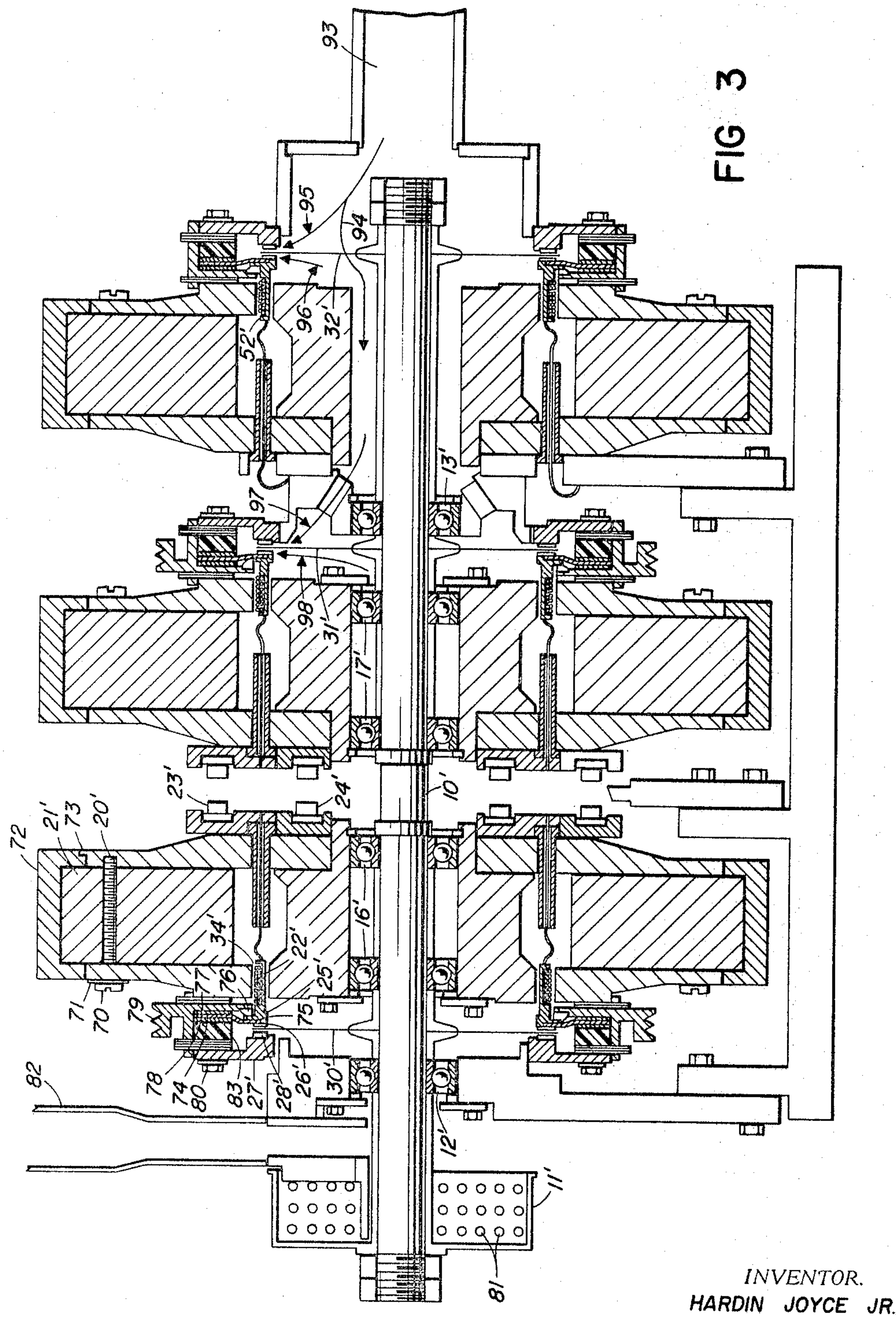
FIG. 3 is a broken-away plan view of a more sophisticated form of the invention.

It should be noted that there is always a spring tension on the clutch face 26, tending to return it to an non-engaged position away from the disc. The specific spring means which produces this tension is not shown in FIG. 1, but is shown in FIG. 3 and will be described hereinafter. With respect to FIG. 1, however, assume that such spring tension does exist.

Returning again to the current waveform of FIG. 5*a*, it is to be noted that at time $t_2$ the magnitude of the energizing current is reduced markedly. Such reduction in energizing current is due to the fact that the acceleration of the disc has been completed at this time and a lesser force is required to maintain good friction contact between the clutch faces and the disc. Thus, during the time interval $t_2$–$t_3$, which may be a few milliseconds to several minutes, depending on what is being recorded or read from the tape, the clutch will remain engaged with the disc. At time $t_3$ the energizing current is caused to go negative, thereby disengaging the clutch from a disc in preparation for braking the capstan shaft 10. The current waveform input to the coil of the braking clutch is shown in FIG. 5*e*. It will be observed that during the time interval $t_0$–$t_3$ the net force is negative on the braking clutch, i.e., the clutch is forced to disengage the disc. Such negative net force is due to the spring tension on the braking clutch coil 52 (designated as clutch coil 52′ in FIG. 3).

Referring now to FIG. 5*b*, there is shown the forces existing in either clutch actuating coil 22 or 45, depending on which direction of rotation is desired. The dotted line 60 represents the magnetic forces caused directly by the interaction of the magnetic flux and the permanent magnet, such as the permanent magnet 21 of FIG. 1, and the magnetic field creatd by the current through the clutch actuating coil. The dotted line 62 represents the force exerted on the actuating coil due to the spring, which action will be described in detail in connection with FIG. 3. The net overall force on the actuating coil is represented by the solid line 61.

In FIG. 5*c* there is shown a curve of the displacement of a clutch coil in inches vs. time. In FIG. 5*d* there is shown a chart of tape velocity, or peripheral velocity, of a capstan in inches per second. FIG. 5*e* shows the net force of the brake actuator as discussed briefly above. It will be observed that braking occurs immediately after the clutch coil, associated with one of the rotating flywheels, is released at time $t_3$. As in the case of the energizing current in FIG. 5*a*, the energizing current of the braking means has a dip occurring at approximately $t_5$. Such current dip produces a dip in the net force, as shown in FIG. 5*e*, thus eliminating most of the bounce that would otherwise occur when the clutch impacts upon the rotating disc. The braking force of the braking coil is then increased and held until time $t_0$, at which time the force is decreased. As in the case of FIG. 5*a*, the high force is necessary only during the short interval of time required to decelerate and stop the disc. After the disc has been stopped at time $t_6$ the force can be reduced appreciably and still hold the disc in a braked position.

Referring now to FIG. 5*f*, there is shown the amount of displacement of the brake actuating coil 52 in inches. It is to be noted that the curve of FIG. 5*f* is very similar to that of the curve of FIG. 5*c*, which shows the clutch coil displacement during an accelerating period.

Figure 2:
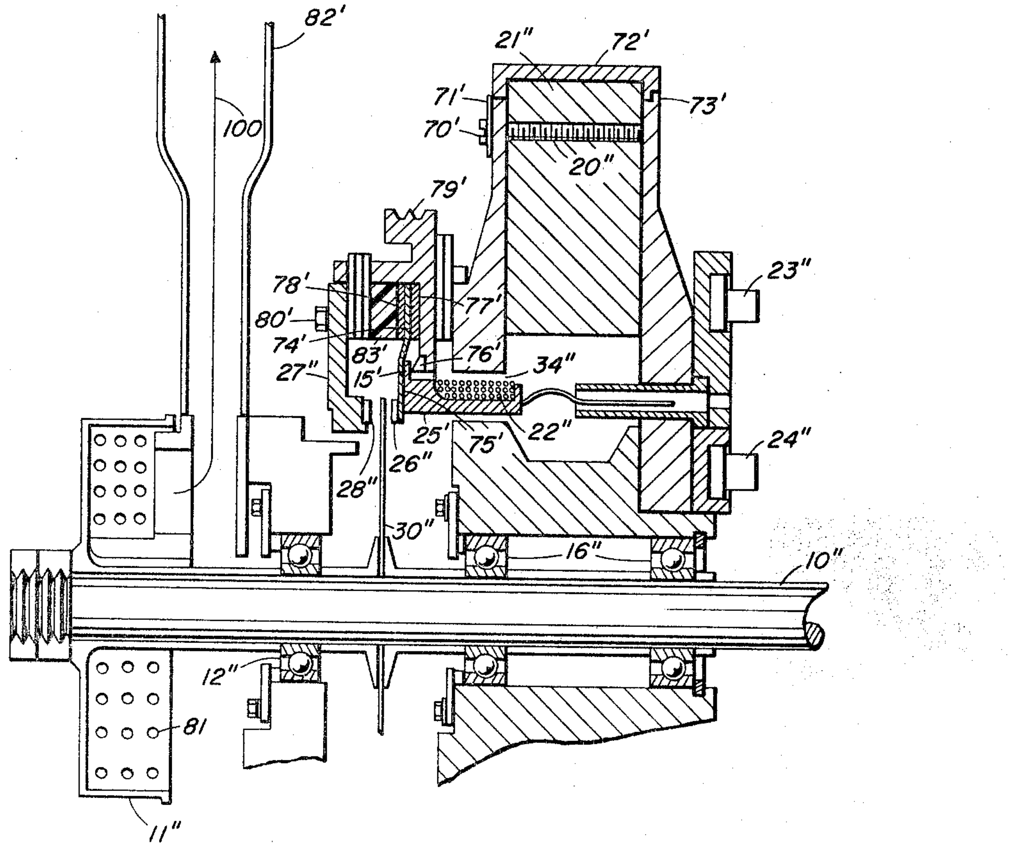
FIG. 2 is a simplified drawing one one-half section of the flywheel and is included herewith primarily for purposes of clarity.

Referring now to FIGS. 3 and 2, there is shown a detailed drawing of a more sophisticated form of the invention. FIG. 2 is actually a blown-up view of the upper left-hand portion of FIG. 3 and functions to show the details of the structure with more clarity. The principal additions of elements present in FIG. 3 that are not present in FIG. 1, relate to the spring tension means for spring biasing the clutch actuating coils, pulley means for providing a link to an external driving force, and means for cooling the structure. All of the elements in FIG. 3 which are also shown in FIG. 1, are represented by similar reference characters in FIGS. 3 and 2, but primed.

Consider first the spring means for biasing the clutch actuating coils. One of such spring means is identified (in FIG. 2) by reference characters 74' and 75'. The portion represented by reference character 74' is secured within two shim means 78' and 77', a spacer means 83', an arm 27'' and a bolt 80'. All of the immediately aforementioned structure and the pulley 79' are rigidly connected to the main flywheel driving means. The portion 75' of the leaf spring is annular in shape and is secured to the annularly shaped coil form 25'. Thus, the only connection between the coil 22'' and the main flywheel structure is the leaves of the leaf spring. For any given flywheel, the leaf spring consists of from four to six individual leaf springs, which are spaced equidistant around the main capstan shaft 10'', and are secured in the manner shown in FIG. 2 between the shims 78' and 77'.

Figure 4:
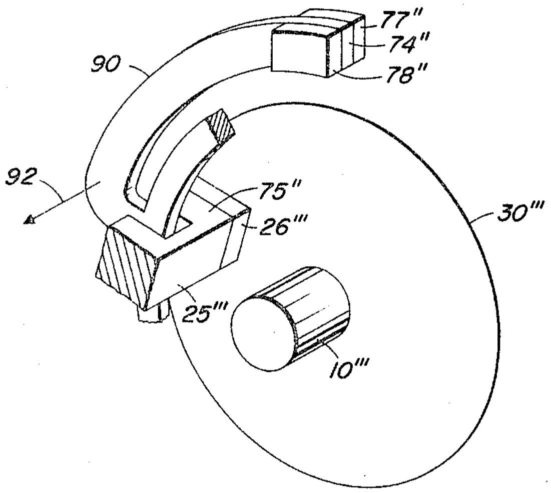
FIG. 4 is a detailed showing of a flexible disc and the clutch faces which grip the discs.

FIG. 4 is a blown-up view of the spring, disc, clutch face, and capstan shaft. In FIG. 4 the end 74'' of the spring is gripped between the shims 77'' and 78''. The main body of the spring, designated by character 90, extends circumferentially around and outside the perimeter of the disc 30'''. The free end of the spring, designated by reference character 75'', is formed to press against the inner side of the coil form holder 25''' to force the clutch face 26''' away from the disc 30''' in the direction of the arrow 92.

The functions of shims 77'' and 78'' are largely for adjustment purposes to permit the correct tension of the spring upon the coil form holders to be obtained.

Cooling of the arrangement is accomplished in the following manner. Air is forced into air duct 93 at the right-hand end of FIG. 3, and follows the path of the arrows 95, 96, 97, and 98. The discs 30', 31', and 32' have apertures formed therein to permit passage of air therethrough. Most of the cooling is required at the point of contact between the clutch faces and the discs and, as can be seen from the arrows 94 and 98, the air flow is directed to such points. A similar air flow is carried out through flywheel arrangement 14 (FIG. 1). However, due to the number of reference characters in that area, arrows showing the path of the airflow are not illustrated in the figure.

Referring again to FIG. 2, there is shown an air exhaust duct 82' through which air is pumped in the direction of arrow 100, by pumping means which is not shown in the figure. Capstan 11'' has a number of perforations, such as perforation 81, therein. Because of these perforations, the partial vacuum created within capstan 11'' functions to hold the tape (not shown) firmly against capstan 11''.

It is to be understood that the form of the invention shown and described herein is but a preferred embodiment thereof and that various changes may be made in design and arrangement without departing from the spirit or the scope of said invention.

I claim:

1. Shaft driving means comprising:
shaft means having a thin flexible disc mounted concentrically and rigidly thereon, and in a plane normal to the plane of the axis of said shaft means;
flywheel means mounted concentrically on said shaft means and constructed to rotate freely on said shaft means;
a pair of clutch faces mounted on said flywheel means and positioned on opposite sides of said flexible disc;
permanent magnet means mounted on said flywheel means;
actuating coil means constructed to hold securely a first of said clutch faces and movably mounted on said flywheel means to move in a direction substantially normal to the plane of said disc;

means for driving said flywheel means; and
means for energizing said actuating coil means to produce a magnetic field therearound;
said permanent magnet means and said actuating coil means being constructed to produce interacting magnetic fields to cause said actuating coil means to move toward said disc and to grip said disc between the said two clutch faces and thereby alter the angular velocity of said disc to the angular velocity of said flywheel means.

2. Shaft driving means in accordance with claim 1, in which said flywheel means is generally toroidal in shape and of magnetic material and comprising:
a first annularly shaped groove formed in the outer perimeter thereof and concentric with said shaft means;
and a second annularly shaped groove formed around the side thereof and through to said first groove, and concentric with said shaft means;
in which said permanent magnet is annularly shaped and is positioned within said first groove to provide a pattern of magnetic flux lines radial with respect to the axis of said shaft means, and across said second groove;
and in which said actuating coil means is an annularly shaped coil comprised of annularly shaped turns and positioned within said second annularly shaped groove.

3. Shaft driving means in accordance with claim 2 comprising:
annularly shaped spring means with leaves thereon, said leaves being secured rigidly to said flywheel means;
the annularly shaped portion of said spring means being positioned concentrically around said shaft means and affixed to said actuating coil means to bias the clutch face on said actuating coil means a predetermined distance from the disc when the coil means is not energized.

4. Shaft driving means comprising:
supporting means;
shaft means rotatably mounted on said supporting means and having first, second, and third flexible discs mounted concentrically and rigidly thereon, and in a plane normal to the axis of said shaft means;
first and second flywheel means constructed to coact respectively with said first and second flexible disc means and mounted concentrically on said shaft means and constructed to rotate freely on said shaft means;
braking means mounted rigidly on said supporting means and constructed to coact with said third disc means;
means for driving said first and second flywheel means in clockwise and counterclockwise directions, respectively;
each of said fllywheel means and said braking means comprising:
a pair of clutch faces mounted thereon;
each of said pair of clutches positioned on opposite sides of the associated coacting flexible disc;
permanent magnet means mounted thereon;
actuating coil means constructed to hold securely a first of said clutch faces and movably mounted thereon to be movable to move in a direction substantially normal to the plane of said discs; and
means for energizing said coil actuating means to produce a magnetic field therearound;
said permanent magnet means and said actuating coil means being constructed to produce interacting magnetic fields to cause said actuating coil means to move toward the associated coacting disc and to grip said disc between the said pair of clutch faces and thereby cause said disc to assume the velocity of said pair of clutch faces.

5. Shaft driving means in accordance with claim 4; in which said flywheel means and braking means are each generally toroidal in shape and of a magnetic material and each comprising:

a first annularly shaped groove formed in the outer perimeter thereof and concentric with said shaft means;

and a second annularly shaped groove formed around the side thereof and through to said first groove, and concentric with said shaft means;

in which said permanent magnet is annularly shaped and is positioned within said first groove to provide a pattern of magnetic flux lines, radial with respect to the axis of said shaft means, and across said second groove;

and in which said actuating coil means is an annularly shaped coil comprised of annularly shaped turns and positioned within said second annularly shaped groove.

6. Shaft driving means in accordance with claim 5 comprising:

annularly shaped spring means with leaves thereon, said leaves being secured rigidly to said flywheel means;

the annularly shaped portion of said spring means being positioned concentrically around said shaft means and affixed to said actuating coil means to bias the clutch face on said actuating coil means a predetermined distance from the associated coacting disc when the coil means is not energized.

7. Shaft driving means comprising:

supporting means;

shaft means rotatably mounted on said supporting means and having first and second flexible discs mounted concentrically and rigidly thereon, and in a plane normal to the axis of said shaft means;

first and second flywheel means constructed to coact respectively with said first and second flexible disc means and mounted concentrically on said shaft means and constructed to rotate freely on said shaft means;

means for driving said first and second flywheel means in clockwise and counterclockwise directions, respectively;

each of said flywheel means comprising:

a pair of clutch faces mounted on each of said first and second flywheel means and on said braking means;

each of said pair of clutches positioned on opposite sides of the associated coacting flexible disc;

permanent magnet means mounted thereon;

actuating coil means constructed to hold securely a first of said clutch faces and movably mounted thereon to be movable in a direction substantially normal to the plane of said discs;

and means for energizing said coil actuating means to produce a magnetic field therearound;

said permanent magnet means and said actuating coil means being constructed to produce interacting magnetic fields to cause said actuating coil means to move toward the associated coacting disc and to grip said disc between the said pair of clutch faces and thereby cause said disc to assume the velocity of said pair of clutch faces.

8. Shaft driving means in accordance with claim 7; in which said flywheel means are each generally toroidal in shape and of a magnetic material and comprising:

a first annularly shaped groove formed in the outer perimeter thereof and concentric with said shaft means;

and a second annularly shaped groove formed around the side thereof and through to said first groove, and concentric with said shaft means;

in which said permanent magnet is annularly shaped and is positioned within said first groove to provide a pattern of magnetic flux lines, radial with respect to the axis of said shaft means, and across said second groove;

and in which said actuating coil means is an annularly shaped coil comprised of annularly shaped turns and positioned within said second annularly shaped groove.

9. Shaft driving means in accordance with claim 8 comprising:

annularly shaped spring means with leaves thereon, said leaves being secure drigidly to said flywheel means;

the annularly shaped portion of said spring means being positioned concentrically around said shaft means and affixed to said actuating coil means to bias the clutch face on said actuating coil means a predetermined distance from the disc when the coil means is not energized.

References Cited by the Examiner

UNITED STATES PATENTS

| | | | |
|---|---|---|---|
| 1,823,334 | 9/1931 | Payne | 192—84 |
| 1,891,982 | 12/1932 | Hodgson | 192—84 |
| 3,123,193 | 3/1964 | Marland | 192—18 |

MARK NEWMAN, *Primary Examiner.*

A. T. McKEON, *Assistant Examiner.*